United States Patent [19]
Takagi et al.

[11] Patent Number: 4,700,383
[45] Date of Patent: Oct. 13, 1987

[54] LOCK-RELEASING MECHANISM FOR TELEPHONE SET WITH MUTING FUNCTION

[75] Inventors: Hisamitsu Takagi, Inagi; Tetsuya Hanawa; Akihide Nishiyama, both of Yokohama; Yutaka Takashima, Kawasaki, all of Japan

[73] Assignee: Fujitsu Limited, Kawasaki, Japan

[21] Appl. No.: 844,390

[22] PCT Filed: Jul. 23, 1985

[86] PCT No.: PCT/JP85/00419

§ 371 Date: Mar. 14, 1986

§ 102(e) Date: Mar. 14, 1986

[87] PCT Pub. No.: WO86/01059

PCT Pub. Date: Feb. 13, 1986

[30] Foreign Application Priority Data

Jul. 24, 1984 [JP] Japan .................................. 59-152144
Nov. 30, 1984 [JP] Japan .................................. 59-254362

[51] Int. Cl.⁴ ........................ H04M 1/19; H04M 1/04; H04M 1/06

[52] U.S. Cl. ..................................... 379/421; 379/422; 379/425; 379/427; 379/433

[58] Field of Search ........... 179/100 R, 100 C, 100 D, 179/103, 158 R, 169, 178, 179; 379/421, 422, 423, 424, 425, 427, 428, 433

[56] References Cited

U.S. PATENT DOCUMENTS

| | | | |
|---|---|---|---|
| 1,830,035 | 11/1931 | Loeffler | 379/422 |
| 2,245,835 | 6/1941 | Stehlik | 379/52 |
| 3,396,244 | 8/1968 | Kowaleski | 379/424 |
| 4,117,276 | 9/1978 | Zurawski | 379/437 |
| 4,476,354 | 10/1984 | Uchino et al. | 379/445 |
| 4,609,790 | 9/1986 | Kaiwa et al. | |

OTHER PUBLICATIONS

Communication Mfd. Co. ad, 12, Dec. 12, 1970.

*Primary Examiner*—Gene Z. Rubinson
*Assistant Examiner*—Danita R. Byrd
*Attorney, Agent, or Firm*—Staas & Halsey

[57] ABSTRACT

A lock-releasing apparatus for use in a telepone set, having a lock-releasing button (61) for a locking mechanism which locks a handset (41) stationarily to a cradle (42). The lock releasing button also actuates a muting switch (71).

7 Claims, 9 Drawing Figures

LOCK-RELEASING MECHANISM FOR TELEPHONE SET WITH MUTING FUNCTION

BACKGROUND OF THE INVENTION

The present invention relates to a telephone set consisting of a handset and a cradle for the handset.

1. Field of the Invention

More particularly, it relates to a lock-releasing mechanism of a telephone handset having a muting function of a mobile or portable radiotelephone set convenient for use when fitted in a vehicle such as an automobile.

2. Description of the Related Art

Telephone sets of this type must be fitted in such a way that the handset cannot fall out of the cradle or cause a vibrating noise when the vehicle such as an automobile is subject to vibration or shock. To this end, commonly the handset is removably fixed by a locking mechanism or the like. Therefore, it is very important for the handling of telephone sets of this type that the handset can be easily placed on the cradle or removed from the cradle and that the structure of the locking mechanism ensures a smooth working thereof.

The telephone transmitter is arranged so that it will always pick up vocal sounds and transmit them to another party. Thus, when a conversation not desired to be heard by the other party is to be made with any nearby person or when it is intended to block any noise at the first party from the other party, the transmitter is usually covered by the palm of the hand to intercept such speech or noise (namely, muting). Particularly where the telephone set is fitted in an automobile, there will be other cases where such muting is necessary.

Many conventional telephone sets of this type are so arranged that the handset is retained with the receiver-side head surface thereof in contact with the bottom surface of the depressed portion of the cradle, and a locking pawl, lock-releasing mechanism, and lock-releasing button are provided on the cradle. Telephone sets of this type are advantageous in that the handset thereof can be designed to be compact and lightweight. However, since the receiver-side head surface is in contact with the bottom surface of the depressed portion of the cradle, the handset cannot be retained in a stable manner, so that the pushbuttons cannot be easily operated since the handset becomes unstable when they are operated; also the handset cannot be easily replaced on the cradle or removed from the cradle since the lock-releasing button is located on the cradle.

In some of the telephone sets proposed heretofore, the locking pawl, lock-releasing mechanism, and lock-releasing button are all provided on the handset. In any of these types of conventional telephone sets, however, the handset necessarily becomes large and heavy and is not easy to handle.

For the muting operation with a conventional telephone set, especially with an automotive telephone set, it is difficult to cover the transmitter with the palm of the hand since only one hand is usable during speech while the car is being driven; therefore, muting of the voice from the first party is not possible with the conventional automotive telephone set during driving of the car. It has been proposed to provide a dedicated voice muting switch which permits muting of the voice from the first party.

However, provision of such a dedicated voice muting switch independently of the lock-releasing mechanism on the handset will give rise to a safety problem during car driving, whether it is located at a point other than the handset or on the handset itself, and to another problem from the viewpoint of the limited space available for the telephone set.

SUMMARY OF THE INVENTION

The object of the present invention is to overcome the above-mentioned drawbacks of the prior art by providing a telephone set with a handset which is compact and lightweight and which has a muting function, and in which the handset can be stably retained on the cradle, by providing locking and lock-releasing (unlocking) mechanisms which permit the handset to be replaced on the cradle or removed from the cradle very easily. A lock-releasing button forming a part of the unlocking mechanism is utilized as an actuator for the muting switching, whereby a muting operation can be simply carried out.

According to the present invention, the above object can be attained by providing a telephone set, comprising a handset having a transmitter or microphone section at one end thereof and a receiver or speaker section at the other end, and a cradle for supporting the handset at opposite ends thereof. A locking mechanism is provided between the handset and cradle which stationarily retains the handset on the cradle. A lock-releasing mechanism with a lock-releasing button, is provided on the handset. A muting switch, operative by being interlocked with the operation of the lock-releasing button, is also provided on the handset, whereby any vocal sounds by the first party can be intercepted from transmission to another party by the muting switch actuated by the lock-releasing button.

The greatest advantage of the present invention is that the lock-releasing button provided on the handset is also used as the actuator to open and close the contacts of the muting switch; namely, when the lock-releasing button is operated, the muting contacts are automatically actuated. The inventors have taken into consideration the fact that the lock-releasing and muting operations will not always occur simultaneously, and thus have provided a common lock-releasing button which carries out both operations.

DESCRIPTION OF THE PREFERRED EMBODIMENT

Figure 7:
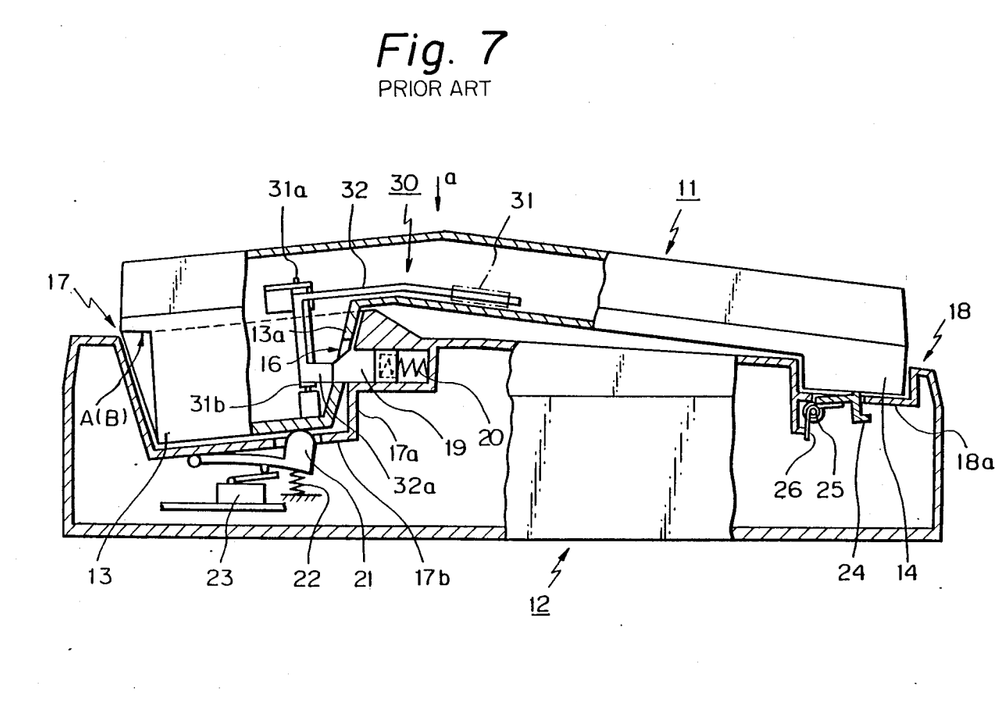
FIG. 7 is an explanatory view of the lock-releasing mechanism of a conventional telephone set.
Figure 8:
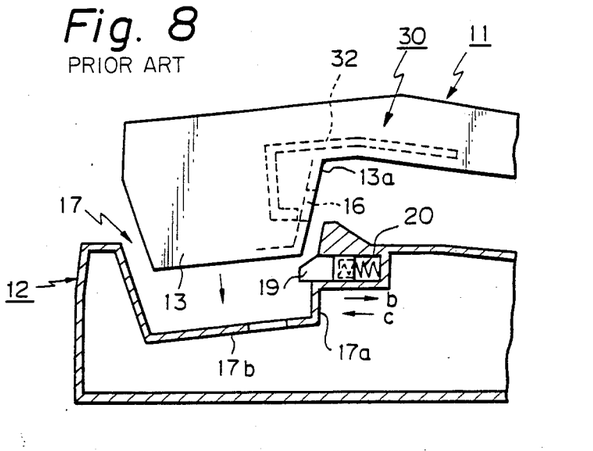
FIG. 8 is a view for explaining the locking of the handset of FIG. 7 on the cradle.
Figure 9:
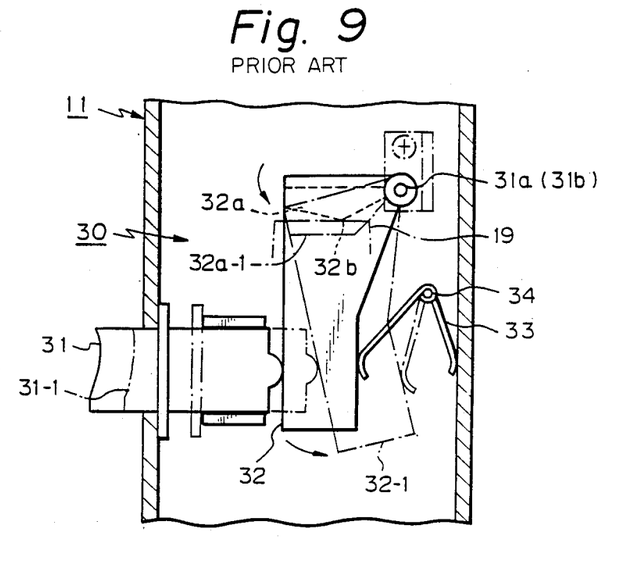
FIG. 9 is a plan view of the lock-releasing mechanism viewed from the direction of arrow a in FIG. 7.

Referring to FIGS. 7 to 9, a lock-releasing mechanism of the conventional automotive telephone set, on which the present invention is based, will be explained.

FIGS. 7 to 9 show the lock-releasing mechanism of the telephone set described in the Japanese Unexamined Patent Publication (Kokai) No. 59-72261. FIG. 7 is a side elevation showing the state in which the handset 11 is locked on the cradle 12, FIG. 8 explains the locking of the handset 11 in FIG. 7 on the cradle 12, and FIG. 9 is a plan view of the lock-releasing mechanism 30 viewed from the direction of arrow a in FIG. 7 (here, the lock-releasing mechanism is shown as having been rotated 90 degrees clockwise and horizontally from the status of FIG. 7).

As shown in FIG. 7, the handset 11 consists of a receiver or speaker section 13 and a transmitter or microphone section 14, and a lock-releasing mechanism 30, which will be described later, provided inside the handset 11. An engagement hole 16 is formed in an inner wall 13a of the receiver section 13 and an abutting wall A (B) is formed as a depression at each of the right and left outer corners of the handset 11. The cradle 12 has a depression 17 formed therein for receiving the receiver section 13 and another depression 18 for receiving the transmitter section 14. Provided inside an inner wall 17a of the depression 17, and opposite to said engagement hole 16, is a slidable locking pawl 19 biased outward by a spring 20, and within a bottom wall 17b of the depression 17 is provided a hook lever 21 biased upward by a spring 22. Further, a hook switch 23 is disposed so as to be interlocked with the hook lever 21. Also provided within the bottom wall 18a of the depression 18 is a push-up member 24 having one end thereof supported by a shaft 25 and the free end thereof disposed so as to always be biased upward by a spring 26.

When the handset 11 is to be locked on the cradle 12, the locking pawl 19 is gradually pushed inward (in the direction of arrow b) by the inner wall 13a of the receiver section 13 as the receiver section 13 of the handset 11 is pushed into the depression 17 of the cradle 12, as shown in FIG. 8. When the engagement hole 16 reaches a position opposite the locking pawl 19, the locking pawl 19 is automatically protruded again under the force of the spring 20 (in the direction of arrow c), enters the engagement hole 16, and thus locks the handset 11 by engaging the receiver section 13 as shown in FIG. 7. That is to say, as evident from the Figures, the handset 11 is supported at the outer right and left ends of the abutting walls A and B, respectively, and the upper right and left corner portions, respectively, of the depression 17 of the cradle 12, and when the transmitter section 14 is pushed upward by the push-up member 24, the abutting walls A and B are forced onto the upper right and left corner portions, respectively, of the cradle 12, with the locking pawl 19 as a fulcrum, whereby the handset 11 is retained or locked.

The handset is unlocked by means of the lock-releasing mechanism 30 shown in FIG. 9. As apparent from the Figure, the lock-releasing mechanism 30 comprises mainly a lock-releasing or unlocking button 31, a lock-releasing or unlocking lever 32, and a spring 33. The outer end of the button 31 protrudes outside the handset 11 and the inner end abuts against one side face of the rear end (at the lower side as viewed toward the plane of FIG. 9) of the lock-releasing lever 32 so that the inner end is movable inward and outward. The lock-releasing lever 32 is disposed so as to be horizontally pivotable by a pair of upper and lower bearings 31a and 31b (see FIG. 7) provided integrally with the other side (opposite to the button 31) of the front end of the lever 32 are supported pivotably within the handset 11. Also, the side face of the lock-releasing lever 32 is formed as a deformed U-shaped section as shown in FIG. 7, and the end 32a thereof is disposed oppositely as a member pressing onto the locking pawl 19. The spring 33 is fitted on a pin 34 fixed to the handset 11 and one end thereof is retained on the side wall of the handset 11 and the other end is disposed generally opposite to the lock-releasing button 31 so as to always bias the side face of the lock-releasing lever 32. Therefore, when in their normal state, the button 31 and lever 32 are biased to their respective positions, as shown by solid lines in FIG. 9. In this normal state, the end 32a of the lever 32 takes a position opposite to the end of the protruding locking pawl 19 which is in the locked state. The end 32a of the lever 32 is convex so that the apex 32b thereof is in point-contact with the locking pawl 19.

The lock-releasing mechanism 30 functions will be described below.

Referring to FIG. 9, when the lock-releasing button 31 is pushed into the position shown by a dot-dash line 31-1 against the force of the spring 33, the lock-releasing lever 32 is pivoted to the position shown by a dot-dash line 32-1, as it is interlocked with the movement of the button 31. As the lever 32 is pivoted, the end 32a thereof is also pivoted to the position shown by a dot-dash line 32a-1 in FIG. 9, the apex 32b of the end 32a is pivoted while sliding on the locking pawl 19, and thus pushes in the pawl 19. When the locking pawl 19 leaves the engagement hole 16 in the inner wall 13a of the receiver section 13 shown in FIG. 7, the handset 11 is unlocked and the receiver section 13 is simultaneously pushed up by the hook lever 21, whereby the handset 11 is released from the cradle 12.

In the conventional telephone of the above-mentioned construction, when an unlocking operation is made, the apex 32b of the end 32a of the lever 32 pivots while sliding on the locking pawl 19, and thus pushes in the locking pawl 19, to unlock the handset. Accordingly, the push-in force acts on the locking pawl 19 from a direction oblique to the moving direction of the pawl 19, while the pawl 19 is also sliding. Therefore, the unlocking or lock-releasing operation is not always smooth. Furthermore, when the lock-releasing lever 32 is in its normal state, the outer end face of the end 32a thereof is at an inclined position with respect to the outer face of the inner wall 13a of the receiver section, which mars the appearance of the telephone set, and which also allows an easy ingress of dust or other foreign matter through the clearance created by the inclined inner wall 13a.

The lock-releasing mechanism according to the present invention will overcome the above-mentioned drawbacks or disadvantages of the prior art.

Referring now to FIGS. 1 to 6, one embodiment of the inventive telephone set will be described as follows. The previously-mentioned and other objects and advantages of the present invention also will be better understood from the ensuring description.

Figure 1:
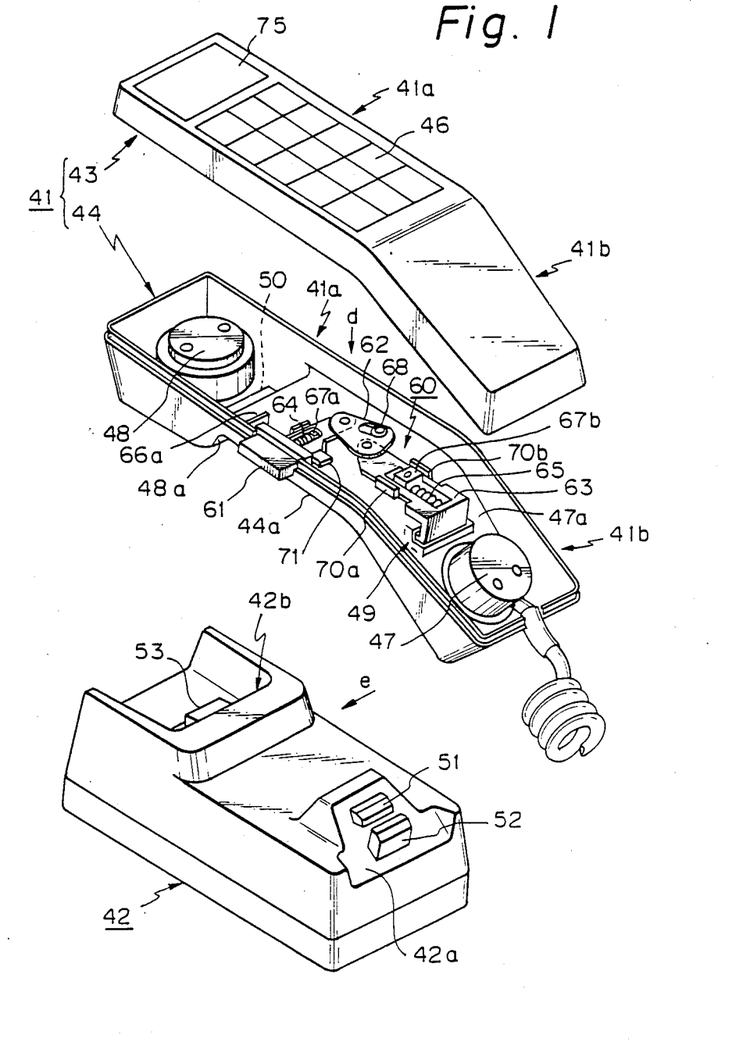
FIG. 1 is an exploded perspective view of the lock-releasing mechanism of a telephone set according to the present invention.
Figure 2:
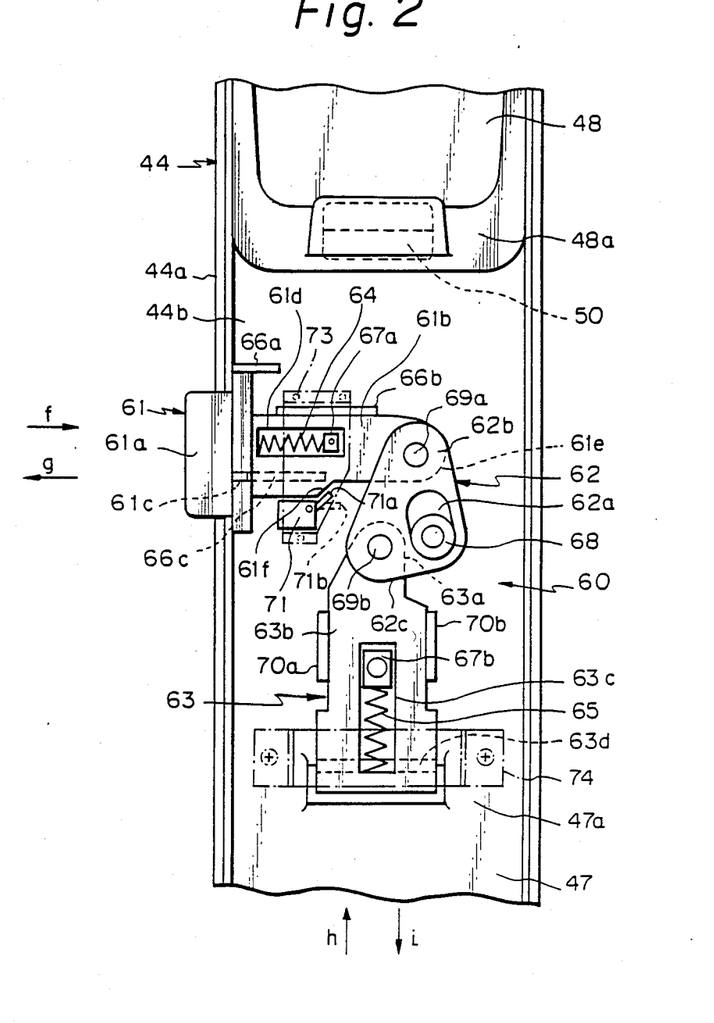
FIG. 2 is a plan view of the lock-releasing mechanism viewed from the direction of arrow d in FIG. 1.
Figure 3:
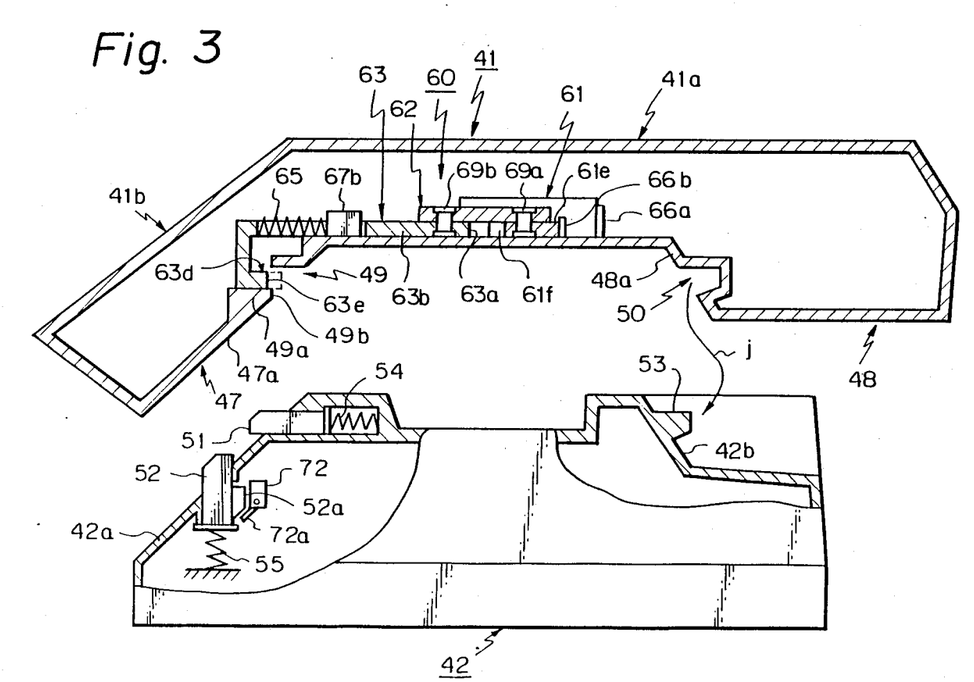
FIG. 3 is an explanatory view of the handset of FIG. 1 prior to being locked on the cradle.
Figure 4:
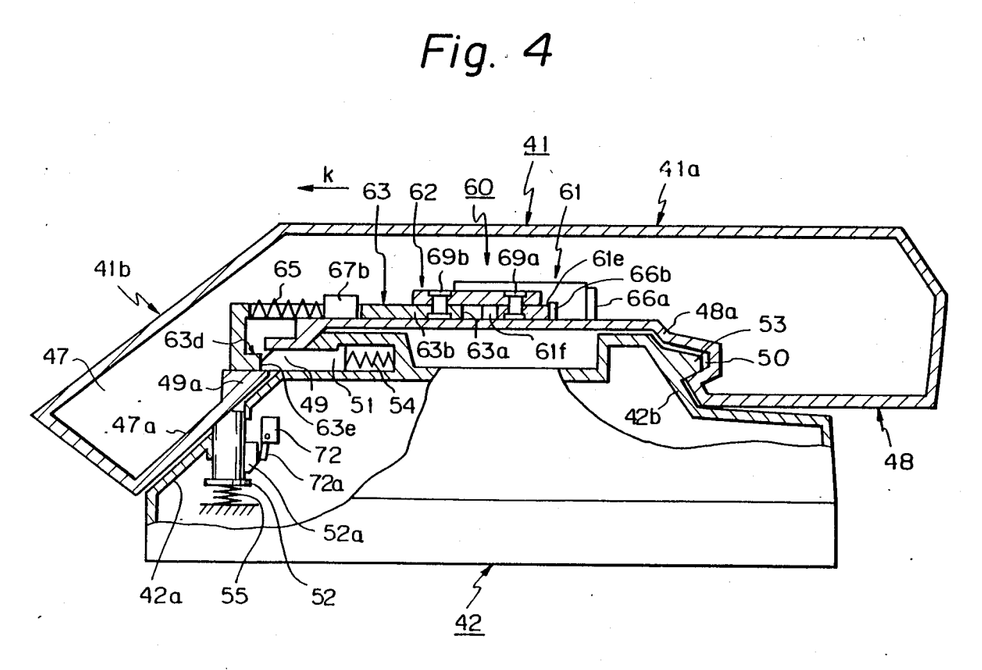
FIG. 4 is a view showing the handset of FIG. 3 when locked on the cradle.

FIG. 1 is a perspective view of the lock-releasing mechanism of the telephone set according to the present invention, showing an exploded view of the handset 41 and cradle 42. The upper cover 43 of the handset 41 is shown as disassembled from the main body 44 of the handset 41. FIG. 2 is a plan view of the lock-releasing mechanism 60 of the handset 41, as viewed from the direction of arrow d in FIG. 1 (here, the lock-releasing mechanism is shown in FIG. 2 as rotated about 45 degrees horizontally clockwise from the state shown in FIG. 1). FIG. 3 explains the locking of the handset 41 in FIG. 1 to the cradle 42 (as viewed from the direction of arrow e in FIG. 1). FIG. 4 is a side elevation showing the handset 41 in FIG. 3 locked on the cradle 42. Note, hereinafter the left side as viewed toward the plane of FIG. 1 will be referred to as the "front side" of the telephone set and the right side as the "rear side".

As apparent from FIG. 1, the handset 41 comprises an upper case 43 and main body 44, the upper case 43 being fixed on the main body 44, and also a main horizontal case 41a and slanted case 41b. The upper case 43 has assembled therein the required parts for a telephone set such as dial buttons (dial switches) 46, telephone number display 75, etc. The main body 44 has a transmitter or microphone section 47 provided at one thereof, namely, at the end of the inclined case section 41b in this embodiment, a receiver or speaker section 48 at the other end, namely, at the end of the main horizontal case section 41a, and the lock-releasing mechanism 60 provided at the intermediate portion between the transmitter and receiver sections. An engagement hole 49 is formed in the inner wall 47a of the transmitter section 47, and an engagement depression 50 is formed in the inner wall 48a of the receiver section 48 (see FIG. 3). The cradle 42 has provided at one inclined wall 42a thereof, namely, at the slanted surface at the rear side, a locking pawl 51 protruded horizontally in the longitudinal direction, which is movable by the force of a spring 54 (see FIG. 3). A the lower portion adjoining the locking pawl 51, a vertically-supported button 52 protruding vertically is provided which is also movable by the force of a spring 55 (see FIG. 3), and at the other slanted wall 42b, namely, at the slanted surface at the front side opposite to the inner wall 48a of the receiver section 48, an engagement protrusion 53 (see FIG. 3) is provided for engagement in the engagement depression 50 provided in the receiver section 48.

As shown in FIGS. 1 and 2, the lock-releasing mechanism 60 comprises mainly a lock-releasing button 61, a bell-crank shaped pivoting link member 62 having an elongated hole 62a as a pivoting fulcrum, a lock-releasing member 63 having a deformed U-shaped section, and compression springs 64 and 65. The lock-releasing button 61 has an outer end 61a thereof protruded outward from the side wall 44a of the handset main body 44, and an inner intermediate section 61b thereof disposed slidably in a direction perpendicular to the length of the main body 44, namely, in the direction of arrow f or g as guided by guide members 66a, 66b, and 66c fixed on the bottom wall 44b of the main body 44. Note that the guide member 66c is slidably fitted in a guide recess 61c formed in the bottom face of the lock-releasing button 61. A rectangular elongated hole 61d is formed in the inner intermediate section 61b of the button 61, in which a compression spring 64 is provided for pre-loading. This compression spring 64 forces the lock-releasing button 61 always outward (in the direction of arrow g). That is to say, the compression or coil spring 64 has one end thereof resting on a support member 67a fixed to the bottom wall 44b of the main body 44, and the other end disposed so as to force the inner end face of the elongated hole 61d in the lock-releasing button 61 outward (in the direction of arrow g). The pivoting link member 62 has an elongated hole 62a pivotably and slidably movable on a fixing shaft 68 fixed on the bottom wall of the main unit 44. The inner end 61e of the lock-releasing button 61 is pivotably coupled to the pivoting link member 62 at one end 62b by means of a pin 69a, and the other end 62c of the link member 62 has one end 63a of the lock-releasing link member 63 pivotably coupled thereto by means of a pin 69b. The lock-releasing link member 63 has a deformed U-shaped section (lateral appearance) as shown in FIG. 3, and the upper long portion 63b thereof is slidably disposed in the longitudinal direction of the main unit 44, namely, in the direction of arrow h or i, as guided by guide members 70a and 70b fixed on the bottom wall of the handset main unit 44. The upper long portion 63b has a rectangular elongated hole 63c formed therein and penetrating therethrough in which a compression spring 65 is disposed for pre-loading and always biases the lock-releasing link member 63 in the longitudinal direction of the main unit 44, namely, in the direction of arrow i. The compression or coil spring 65 has one end thereof resting on a support member 67b fixed to the bottom wall 44b of the main unit 44, and the other end thereof is disposed so as to bias the inner end face of the elongated hole 63c in the direction of arrow i. Therefore, the above-mentioned coil spring 64 and this coil spring 65 cooperate to bias the lock-releasing button 61 (in the direction of arrow g) and the lock-releasing link member 63 in the direction of arrow i. The lock-releasing link member 63 has the other end 63d thereof, namely, the lower short portion, disposed slidably on the lower wall 49a of the engagement hole 49 as shown in FIG. 3, and the end face 63e of the other end 63d is disposed so as to be simultaneously parallelly opposite to and touching the end face of the locking pawl 51 when the handset 41 is locked on the cradle, as shown in FIG. 4. The end face 63e of the end 63d is located as slightly retracted inward from the lower fall end face 49b of the engagement hole 49 when the lock-releasing link member 63 is in the free state, as shown in FIG. 3. Note that reference numerals 73 and 74 in FIG. 2 each denotes a retainer.

Figure 5:
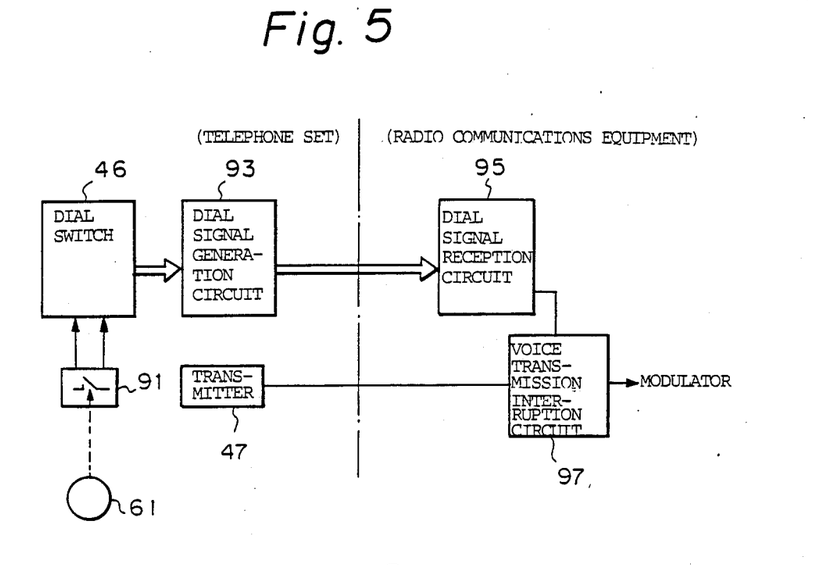
FIGS. 5 and 6 each show an example of a muting-operation control circuit.
Figure 6:
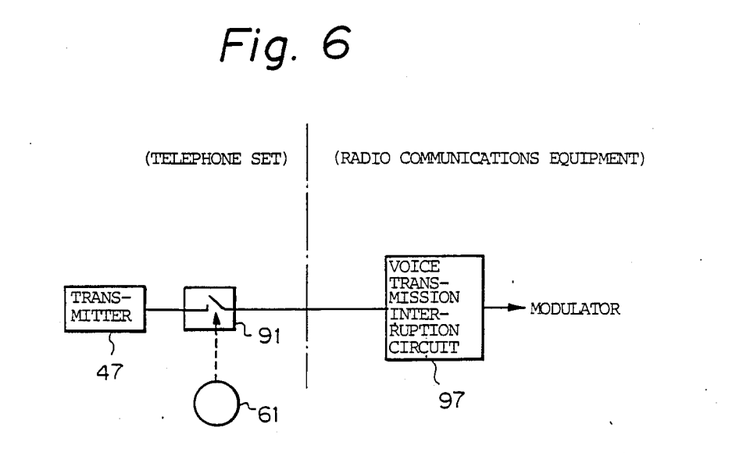

According to the present invention, there is provided adjacent to the lock-releasing button 61, as shown in FIG. 2, a muting switch 71 for turning on and off a transmitter or microphone (not shown). The muting switch 71 may be a small snap switch shown as a microswitch (trade name) having a muting contact 91 (as shown in FIGS. 5 and 6) which turns on the microphone for establishing speech with another party when the switching lever 71a is in the position shown by a solid line, and turns off the microphone to prevent vocal sounds or noise at the first party end when the lever 71a is in the position 71b shown by a dash line. The lever 71a is actuated by an actuator (slanted) 61f provided adjacent the lever 71a and integral with the lateral side of the lock-releasing button 61. Namely, when the button 61 is depressed, the lever 71a is moved by the actuator 61f to the position shown by a dash line 71b, and when the button 61 is returned to the initial position (as in FIG. 2), the lever 71a is automatically returned to the position shown by a solid line.

As is well known, voice signals picked up by the transmitter 47 are passed, through a voice transmission interruption circuit 91 included in the radio comunications equipment and normally connected to the transmitter in the telephone set, to a modulator (not shown)

which provides a modulated signal sent as an electromagnetic wave to the other or destination party, whereby speech can be established between both parties.

On the other hand, when the dial switches 46 are operated to dial any desired other party, on-off information corresponding to the pushed switches is sent from a dial signal generation circuit 93. The signal from the dial signal generation circuit 93 is decoded by a dial signal reception circuit 95 to produce a tone signal corresponding to the dialed phone number and the voice transmission interruption circuit 97 is switched to a dial signal reception circuit 95 at the same time. Thus, the tone signal corresponding to the dialed phone number is supplied to the modulator, which produces a modulated signal for transmission.

In the present invention, the dial switches 46 have connected thereto the muting contact (see FIG. 5) of the microswitch (trade name) 71 shown in FIG. 1. While speech is established, the lock-releasing button 61 is not turned on; in this condition, the muting contact 91 is, for example, turned off so that the dial switches 46 do not work and the voice signal picked up by the transmitter or microphone 47 is passed through the voice transmission interruption circuit 97 to the modulator. If the lock-releasing button 61 is pressed during speech in order to mute the transmission voice, the muting contact 91 is turned on, and the dial switches 46 operate so that a predetermined on/off signal is sent from the dial signal generation circuit 34. The dial signal reception circuit 93 decodes the on/off signal to control the voice transmission interruption circuit 97. Thus the transmitter 47 is disconnected from the modulator, so that the voice input from the transmitter 47 is muted.

In addition, the muting contact 91 may be provided directly in the line providing a connection between the transmitter 47 and the voice transmission interruption circuit 97, as shown in FIG. 6, to control the telephone set.

Thus, with the transmission voice muting apparatus according to the present invention, the transmission voice can be easily muted by pressing the lock-releasing button 61 when necessary during speech. The lock-releasing button 61 is operated when the handset is taken from the cradle for establishing speech as described previously, and it is not needed during speech. During speech, the handset 44 is usually held at a portion near the lock-releasing button 61, so the button can be easily operated without the necessity of taking another hold on the handset just to operate the lock-releasing button.

Note that the essential subject of the present invention is how the muting switch should be actuated, not how the muting is effected after the muting switch is turned on. Since the latter can be carried by various well-known methods, the muting circuits themselves will not be explained herein.

As shown in FIG. 3, a so-called hook switch 72 to control the on/off operation of the telephone set is provided adjoining the vertical-supported button 52. The hook switch 72 is turned on when the switching lever 72a thereof is in a position shown in FIG. 3, namely, a position at which it is slanted with respect to the vertical axis thereof, and is turned off when the switching lever 72a is in a position shown in FIG. 4, namely, a position at which it is generally in parallel with the vertical axis. The hook switch 72 is turned on by an actuator 52a provided adjacent to the switch and integral with the vertically-supported button 52. That is to say, as shown in FIG. 3, when the handset 41 is removed from the cradle 42, the actuator 52a is raised since it is interlocked with the vertically-supported button 52, so that the switching lever 72a is automatically moved to the slanted position as shown, thereby turning on the hook switch 72. When the handset 41 is replaced on the cradle 52 as shown in FIG. 4, the actuator 52a is moved downward since it is interlocked with the button 52, whereby the switching lever 72a is moved to the generally vertical position as shown, and thus the hook switch 72 is turned off.

In order to lock the handset 41 to the cradle 42, the engagement depression 50 in the handset 41 is first fitted onto the engagement protrusion 53 of the cradle 42 as indicated by the arrow j, next the slanted case 41b is pressed onto the slanted wall 42a at the rear side of the cradle 52, and thus the locking pawl 51 and button 52 are gradually forced into the cradle 52 along the inner wall 47a of the transmitter section. When the engagement hole 49 reaches a position opposite the locking pawl 51, the latter will automatically enter the engagement hole 49 under the force of the spring 54 and lock the handset 41 to the cradle 42 as shown in FIG. 4. At this time, the vertically-supported button 52 forces the lower wall 49a of the engagement hole 49 of the transmitter section onto the locking pawl 51 under the force of the spring 55, and also forces the handset 41 rearward (in the direction of arrow k) since an inner wall 47a of the transmitter section is slanted. Thus, the engagement protrusion 53 is securely and closely fitted into the engagement depression 50 as shown in FIG. 4, since they are formed as a taper, and therefore, will not create any vibrating noise even when subjected to vibration or shock.

The functions of the lock-releasing mechanism 60 shown in FIG. 2 for unlocking the handset 41 will be described below.

When the button 61 is depressed (in the direction of arrow f) against the force of the coil or compression spring 64 as shown in FIG. 2, the lock-releasing link member 63 is moved linearly in the direction of arrow h (namely, in parallel to the moving direction of the locking pawl 51) by means of the bell-crank type pivoting link member 62, since it is interlocked with the depression of the button 61, and thus the other end 63d of the lock-releasing link member 63 is moved to a position shown by a dot line in FIG. 3, whereat it forces the locking pawl 51 inward, thereby unlocking the handset 41 and causing the vertically-supported button 52 to raise the transmitter section 47. Thus, the handset 41 is released from the cradle 42. Since the lock-releasing link member 63 moves linearly and generally in parallel to the moving direction of the locking pawl 51, the lock-releasing mechanism 60 can always work smoothly.

As described in detail in the foregoing, the present invention provides a lock-releasing mechanism having a vertically-supported button provided adjacent to the locking pawl, and an engagement protrusion and depression formed so as to be a close taper-fit to each other, whereby the handset can be locked simply and securely to the cradle and the lock-releasing link member moves linearly and in parallel with the moving direction of the locking pawl. As the lock-releasing or unlocking can be always smoothly effected, the reliability of the handset locking and the handset operability can be improved, and also, since the end face 63e of the other end 63d of the lock-releasing lever is disposed in parallel with the end face of the locking pawl, the handset can be designed to have a preferred appearance.

Also, according to the present invention, the voice muting can be easily effected by one hand during speech by arranging the muting switch so that it can be turned on by operating the lock-releasing button. Further, since a dedicated muting actuator such as a button is not needed, the telephone set as a whole can be designed to be compact, lightweight, and simple.

A muting operation during speech will not cause any safety problem and the lock-releasing button is used in common for both lock-releasing and for turning on the muting contact, which will advantageously minimize the spatial limitation to the handset.

The lock-releasing or unlocking mechanism according to the present invention is utilizable in common telephone sets provided with a muting function, and can be very advantageously utilized in automotive telephone sets.

We claim:

1. In a telephone set comprising a handset having a transmitter at one end thereof and a receiver at the other end, a cradle for supporting said handset at opposite ends thereof, and a locking mechanism which stationarily retains said handset on said cradle, a lock-releasing apparatus comprising a lock-releasing button which is provided on said handset and a muting switch on said handset, said muting switch being made operative by being interlocked with the operation of said lock-releasing button, whereby any voice at a first party end can be intercepted against transmission to another party when said muting switch is actuated by said lock-releasing button.

2. A lock-releasing apparatus according to claim 1, wherein said muting switch is provided with an actuating member to control the on/off operation of the muting switch, and said lock-releasing button has an actuator formed thereon to turn on said actuating member.

3. A lock-releasing apparatus according to claim 1, in which said handset has an outer case which is comprised of a main case section and a slanted case section, said slanted case section having a slanted surface extending rearward from said main case section, there being provided between said cradle and said handset a locking mechanism consisting of a protrusion on one of said cradle and said handset and a depression on the other of said cradle and said handset whereby said protrusion is fitted into said depression to lock said handset to said cradle.

4. A lock-releasing apparatus according to claim 3, wherein a slanted surface is provided on said cradle corresponding to said slanted case section of said handset and said locking mechanism is comprised of a movable locking pawl on said slanting surface of said cradle and an engagement hole formed in said slanted case section, said locking pawl being adapted to fit in said engagement hole to lock said handset to said cradle.

5. A lock-releasing apparatus according to claim 4, wherein said lock-releasing button penetrates through a lateral wall of said main case section and has an inner end and an outer end and said lock-releasing apparatus further comprises a pivotable link member having one end thereof pivotably coupled to said inner end of said lock-releasing button and having a fixed shaft fitted in an elongated hole so as to be pivotable about said fixed shaft, and a lock-releasing link member pivotably coupled to the other end of said pivoting link member whereby said lock releasing link member is movable in the same direction as said locking pawl when said lock-releasing button is depressed to move said locking pawl out of engagement with said engagement hole.

6. A lock-releasing apparatus according to claim 3, wherein there is provided on said cradle a resilient rearside support for said handset comprising a resiliently supported, vertically movable button.

7. A lock-releasing apparatus according to claim 6, wherein said cradle further has a hook switch mounted thereon for turning said telephone set on and off, said switch being operated by an actuator attached to said resiliently supported, vertically movable button.

* * * * *

UNITED STATES PATENT AND TRADEMARK OFFICE
CERTIFICATE OF CORRECTION

PATENT NO. : 4,700,383
DATED : Oct. 13, 1987
INVENTOR(S) : TAKAGI et al.

It is certified that error appears in the above-identified patent and that said Letters Patent is hereby corrected as shown below:

Col. 1
Between lines 5 and 6 insert the title "Field of the Invention";
Line 8, delete in its entirety;
Line 13, delete "2";
Line 28, delete "nearly" and insert --nearby--;
Line 29, delete "at" and insert --of--.

Col. 2
Line 16, after "button" insert --,--.

Col. 5
Line 35, delete "A" and insert --At--.

Signed and Sealed this

Fifteenth Day of March, 1988

Attest:

Attesting Officer

DONALD J. QUIGG

Commissioner of Patents and Trademarks